United States Patent [19]

Miyano et al.

[11] 3,835,146

[45] Sept. 10, 1974

[54] SUBSTITUTED FUSARIC ACID DERIVATIVES

[75] Inventors: Tetsuji Miyano; Kunio Suzuki; Hiroshi Fukatsu, all of Nagoya, Japan

[73] Assignees: Banyu Pharmaceutical Co. Ltd., Tokyo; Hiroyoshi Hidaka, Minami-ku, Nagoya-shi, both of, Japan

[22] Filed: May 30, 1972

[21] Appl. No.: 257,834

[30] Foreign Application Priority Data
  May 28, 1971  Japan.............................. 46-36220
  Oct. 1, 1971  Japan.............................. 46-76237

[52] U.S. Cl. ... 260/295 R, 260/295 AM, 260/295 S, 260/270 R, 424/266
[51] Int. Cl. ........................................... C07d 31/36
[58] Field of Search...... 260/295 AM, 295 R, 270 R

[56] References Cited
FOREIGN PATENTS OR APPLICATIONS
1,219,176  1/1971  Great Britain............... 260/295 AM OTHER PUBLICATIONS
Steiner et al., Chem. Abstracts, Vol. 59, No. 1, Pages 562f to 563e July 8, 1963

*Primary Examiner*—Alan L. Rotman
*Attorney, Agent, or Firm*—Oblon, Fisher, Spivak, McClelland & Maier

[57] ABSTRACT

Halo-fusaric acid derivatives of the formula:

$$CH_3-CH-CH_2-CH_2-\underset{N}{\underset{|}{\bigcirc}}-COZ$$
$$\;\;\;\;\;\;|\;\;\;\;\;|$$
$$\;\;\;\;\;X\;\;\;Y$$

wherein X represents halogen or hydrogen, Y represents halogen, and Z represents — OM or an amine, wherein M represents hydrogen or a salt or ester residue thereof which are characterized by significant activity in inhibiting the formation of dopamine-$\beta$-hydroxylase and in the treatment of hypertension, and which are further characterized by relatively low toxicity, are prepared by reacting dehydrofusaric acid with a halogen or a hydrogen halide. Alternatively, these compounds can be produced by reacting halofusaric acid with an acyloxhalomethyl ester.

13 Claims, 3 Drawing Figures

SUBSTITUTED FUSARIC ACID DERIVATIVES

BACKGROUND OF THE INVENTION

1. Field Of The Invention:

This invention relates to novel halo-fusaric acids, and salts, esters or amides thereof, and to a method of preparing said compounds. This invention also relates to a method using said novel halo-fusaric acids, salts, esters or amides thereof for the treatment of hypertension and to inhibit the production of dopamine-$\beta$-hydroxylase.

2. Description Of The Prior Art:

Fusaric acid is known to be a metabolism product produced by microorganisms, particularly vegetable germs. It has recently been discovered that fusaric acid will inhibit the production of dopamine-$\beta$-hydroxylase, and hence might be useful in pharmacological preparations, except that it is quite high in toxicity.

It would be quite desirable, therefore, to provide related derivatives of fusaric acid which are likewise characterized by dopamine-$\beta$-hydroxylase inhibiting activity, but which have a reduced toxicity level.

SUMMARY OF THE INVENTION

Accordingly, it is one object of this invention to provide fusaric acid derivatives which are effective for inhibiting dopamine-$\beta$-hydroxylase.

It is another object of this invention to provide a process for preparing said fusaric acid derivatives.

It is still another object of this invention to provide a process of using said fusaric acid to reduce the levels of dopamine-$\beta$-hydroxylase and for the treatment of hypertension.

These and other objects, as will hereinafter become more readily apparent, have been attained by the provision of halo-fusaric acid derivatives of the formula:

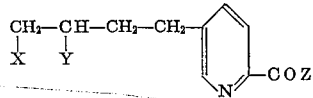

wherein X represents halogen or hydrogen, Y represents halogen, and Z represents -OM or an amine, and wherein M represents hydrogen or a salt or ester residue thereof.

DETAILED DESCRIPTION OF THE PREFERRED EMBODIMENTS

The halo-fusaric acids, salts esters or amides of this invention have the formula:

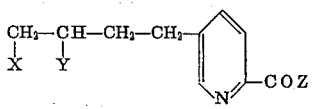

wherein X represents hydrogen or halogen atom; and Y represents a halogen atom; Z represents -OM or an amino group; M represents hydrogen or a salt or ester residue.

Representative of X and Y are hydrogen, chlorine, bromine, and iodine atom. Representative of M are hydrogen, sodium, potassium calcium, magnesium, aluminum atom; residue of dibenzylethylenediamine or procaine salt; methyl, ethyl, acetoxymethyl, ethoxymethyl, phenacyloxymethyl, benzoyloxymethyl, pivaloyloxymethyl, or acyloxymethyl group. Representative of Z is monomethylamino, or dimethylamino group.

Using the methods of this invention, 10·11-dihalo-fusaric acid can be prepared by dissolving dehydrofusaric acid in an inert organic solvent, e.g., chloroform, and ether, cooling and admixing with a halogen to provide an addition reaction. The 10·11-dihalo-fusaric acid product can then be purified by conventional purification procedures, such as recrystallization or silica chromatography to yield purified crystals.

Typical of the 10·11-dihalo-fusaric acid produced herein is 10·11-dibromo-fusaric acid, which is characterized as colorless needle-like crystals having a melting point of 105° – 106°C., and is soluble in alcohol, chloroform, benzene, ethylacetate, and hot water. It is insoluble in cold water and petroleum ether, and yields a positive test result in Beilstein reagent.

Elementary Analysis shows that the compound is: C : 35.6 percent, H: 3.33 percent, N: 4.30 percent, and Br : 46.92 percent (calculated value of $C_{10}H_{11}O_2N \cdot Br_2$ C: 35.64 percent, H : 3.29 percent, N : 4.16 percent, Br : 47.42 percent). The ultraviolet absorption spectrum of the compound is $\gamma$max in methanol 269 m$\mu$ and $E_{1cm}^{1\%}$ 159 (the ultraviolet absorption spectrum of fusaric acid is $\gamma$max in methanol 269 m$\mu E_{1cm}^{1\%}$ 310.)

Figure 1:
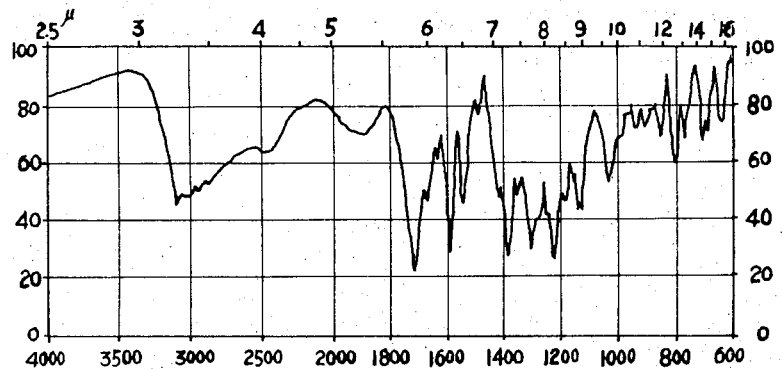
FIG. 1 is the infrared absorption spectrum (potassium bromide tablet) of 10·11-dibromo-fusaric acid produced according to this invention.

The infrared absorption spectrum of this compound is as shown in FIG. 1.

The nuclear magnetic resonance spectrum (CDCl$_3$) of this compound is as follows:

| | |
|---|---|
| $\delta$ 2.0 – 2.7, 2H, multiplet, | (—CHBr—CH$_2$—CH$_2$—); |
| $\delta$ 2.7 – 3.2, 2H, multiplet, | (—CH$_2$—CH$_2$—); |
| $\delta$ 3.4 – 4.3, 3H, multiplet, | (CH$_2$Br—CHBr—CH$_2$—); |
| $\delta$ 7.7 – 7.9, 1H, doublet, | (aromatic H); |
| $\delta$ 8.05 – 8.25, 1H, doublet, | (aromatic H); |
| $\delta$ 8.65, 1H, singlet (broad), | (aromatic H); |
| $\delta$ 10.0, 1H, singlet | (Carboxylic H). |

In this invention, 10-monohalo-fusaric acid can be prepared by dissolving dehydrofusaric acid in water or other suitable organic solvent, if necessary, together with a suitable reagent for generating hydrogen halide. Hydrogen halide is then introduced or generated to effect the addition reaction.

The hydrogen halide can be obtained by various conventional methods. For example, hydrogen bromide can be prepared by reacting tetrahydronaphthalene with bromine or by reacting phenol with bromine. Hydrogen iodide can be prepared by reacting tetrahydronaphthalene with iodine or by reacting phosphoric acid with potassium iodide.

10-bromo-fusaric acid prepared in accordance with the process of this invention is characterized as colorless needle-like crystals having a melting point of 112° – 113°C. and is soluble in alcohol, chloroform, acetone, benzene, ethylacetate, and is soluble in hot water but difficultly soluble in cold water. It is insoluble in n-hexane, petroleum ether, and proves positive with Beilstein reagent.

By Elementary Analysis, it is determined that the compound is: C: 46.51 percent, H: 4.95 percent, N:

5.43 percent, Br: 28.52 percent (calculated value of $C_{10}H_{12}O_2NBr$, C : 46.53 percent, H : 4.69 percent, N : 5.43 percent, Br : 30.96 percent). The ultraviolet absorption spectrum of the compound is γmax in methanol 269 $m\mu$ and $E_{1cm}^{1\%}$ 214. (The ultraviolet absorption spectrum of fusaric acid is γmax in methanol 269 $m\mu$ $E_{1cm}^{1\%}$ 310.)

Figure 2:
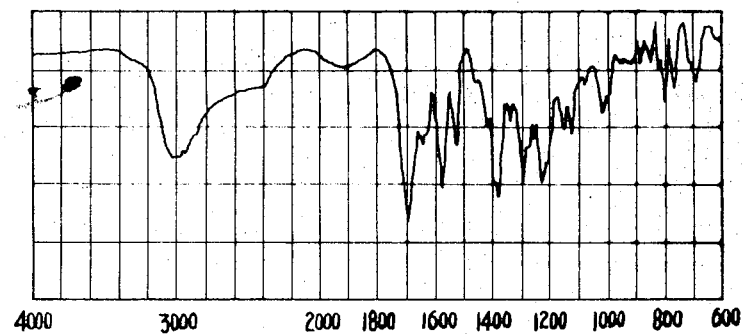
FIG. 2 is the infrared absorption spectrum of 10-mono-bromo-fusaric acid of this invention; and, FIG. 3 is the infrared absorption spectrum of 10-mono-iodo-fusaric acid of this invention.

The infrared absorption spectrum of this compound is as shown in FIG. 2.

The nuclear magnetic resonance spectrum ($CDCl_3$) of this compound is as follows:

| | | |
|---|---|---|
| δ 1.7 – 1.8, | 3H, doublet | ($CH_3$—CHX—) |
| δ 1.9 – 2.3, | 2H, quartet | (—CHX—$CH_2$—$CH_2$—) |
| δ 2.8 – 3.1, | 2H, triplet | (—$CH_2$—$CH_2$—pyridine ring) |
| δ 3.7 – 4.3, | 1H, sixtet | ($CH_3$—CHX—$CH_2$—) |
| δ 7.6 – 8.7, | 3H, | (Aromatic H) |
| δ 10.3, | 1H, singlet | (Carboxylic H) |

The acyloxymethyl ester of halo-fusaric acid or fusaric acid can be prepared by reacting halo-fusaric acid or fusaric acid with an acyloxy halomethyl of the formula:

X $CH_2OCOR$ wherein R represents a lower alkyl, phenyl, aralkyl, benzoyl or phthenacyl group; and X represents a halogen atom. The halo-fusaric acid or fusaric acid is first reacted with a basic material, such as triethylamine, in a water miscible organic solvent, such as formamide, dioxane, or dimethylformamide to yield an organic solvent soluble salt. It is then admixed with 1.5 – 2 times of acyloxyhalomethyl and the mixture is reacted at 0° – 35°C. for 3 – 6 hours.

Following the reaction, a water immiscible organic solvent, preferably, e.g., ethylacetate, ether or benzene, is admixed with the reaction product and the precipitate is filtered and the unreacted organic acid and salt is removed by admixing with water to form an organic solvent layer containing the product and a water layer containing unreacted organic acid or salt. The water layer is then separated from the organic solvent layer. Since the ester of this invention is dissolved only in the organic solvent layer, isolation and purification is quite easy.

Hydrogen chloride, hydrogen bromide, citric acid, or oxalic acid is added to the organic solvent layer to obtain a precipitate of a non-toxic inorganic or organic salt, preferably a hydrochloride salt which is relatively water-insoluble.

The halo-fusaric acids and derivatives thereof prepared by the methods of this invention are characterized by a significant capability of inhibiting dopamine-β-hydroxylase. For example, 10·11-dihalo-fusaric acid and 10-monohalo-fusaric acid have about 10 times the effect in inhibiting the production of dopamine-β-hydroxylase as compared with fusaric acid.

The inhibition data of dopamine-β-hydroxylase by 10·11-dibromo-fusaric acid, 10·11-dichloro-fusaric acid, 10-monobromo-fusaric acid and 10-monoiodo-fusaric acid are shown in the following Table.

TABLE

10·11-dibromo-fusaric acid

| Concentration (Mol.) | Inhibition of dopamine-β-hydroxylase % | |
|---|---|---|
| | 10·11-dibromo-fusaric acid | fusaric acid |
| $2 \times 10^{-9}$ | 15% | 0% |
| $2 \times 10^{-8}$ | 47% | 4% |
| $2 \times 10^{-7}$ | 91% | 37% |
| $2 \times 10^{-6}$ | 100% | 87% |

10·11-dichloro-fusaric acid

| Concentration (Mol.) | Inhibition of dopamine-β-hydroxylase % | |
|---|---|---|
| | 10·11-dichloro-fusaric acid | fusaric acid |
| $2 \times 10^{-9}$ | 2% | 0% |
| $2 \times 10^{-8}$ | 68% | 2% |
| $2 \times 10^{-7}$ | 93% | 77% |
| $2 \times 10^{-6}$ | 98% | 93% |

10-monobromo-fusaric acid

| Concentration (Mol.) | Inhibition of dopamine-β-hydroxylase % | |
|---|---|---|
| | 10-monobromo-fusaric acid | fusaric acid |
| $2 \times 10^{-9}$ | 9% | 0% |
| $2 \times 10^{-8}$ | 59% | 26% |
| $2 \times 10^{-7}$ | 95% | 81% |
| $2 \times 10^{-6}$ | 100% | 100% |

10-monoiodo-fusaric acid

| Concentration (Mol.) | Inhibition of dopamine-β-hydroxylase % | |
|---|---|---|
| | 10-monoiodo-fusaric acid | fusaric acid |
| $2 \times 10^{-9}$ | 5% | 0% |
| $2 \times 10^{-8}$ | 74% | 26% |
| $2 \times 10^{-7}$ | 94% | 81% |
| $2 \times 10^{-6}$ | 100% | 100% |

Toxicity data on mice by intraperitonial administration showed $LD_{50}$ of 10·11-dibromo-fusaric acid was 120 mg/kg, while $LD_{50}$ of fusaric acid was 80 mg/kg enabling the conclusion that 10·11-dibromo-fusaric acid has a lower toxicity than fusaric acid.

The dehydrofusaric acid used for this invention can be prepared by chemical reaction as shown in Chem. Listy Vol. 62, Pages 1206–1219 in 1968, and also can be prepared by cultivation of microorganisms as disclosed by Yabuta T. Kambe K., Hayashi T., J.Agri.-Chem.Soc.Japan, Vol. 10, Pages 1059 (1934).

The crude dehydrofusaric acid prepared by cultivation contains about 10 – 50 percent of fusaric acid, and can be used as the starting material, without prior purification. It is preferable, however, to use pure dehydrofusaric acid purified by the ion-exchange chromatography, fractional chromatography, etc. for greatest yields, although not necessarily greatest economy.

The 10·11-dihalo-fusaric acid and 10-monohalo-fusaric acid prepared by said process of this invention can be converted to various salt, ester, and amide derivatives of the halo-fusaric acid for medicinal use, by conventional procedures.

Among the derivatives obtainable by the methods of this invention are included 10·11-dihalo-fusaric acid and 10-monohalo-fusaric acid, and the sodium, potassium, calcium, magnesium and aluminum salts thereof; dibenzylethylenediamine procaine salt; methyl, ethyl, acetoxymethyl, ethoxymethyl, phenacyloxymethyl, benzoyloxymethyl, pivaloyloxymethyl, and acyloxymethyl esters thereof, and monomethyl-amide and dimethylamide, and derivatives thereof.

(Pharmacological Test)

The anti-hypertensive effect of dibromo-fusaric acid was compared with that of fusaric acid by single administration of a dose of 50 mg/kg (bromo-fusaric acid, 0.15 m moles/kg; fusaric acid 0.28 m moles/kg). The administration of other halo-fusaric acids likewise showed significant activity in decreasing blood pressure and in changing the level of biogenic amine content in vivo.

The level of endogenous norepinephrine in the rat heart and adrenal gland following single oral administration of bromo-fusaric acid was found to fall at a gradient rate reaching lowest values within 6 hours. The maximum depletion of tissue norepinephrine following administration of fusaric acid was observed after 3 hours and returned to normal levels after 9 hours.

Other experiments showed that bromo-fusaric acid is effective to the same extent for reducing blood pressure as is half the dosage of fusaric acid, on a molar basis, and the norepinephrine reduction effect and the anti-hypertensive effect of bromo-fusaric acid is longer lasting than that of fusaric acid.

When administered to rat brains, a dose of 50 mg/kg of bromofusaric acid elicited a 30 percent reduction in norepinephrine content, 25 percent increase in dopamine, 40 percent increase in serotonin. These changes of biogenic amine contents in the brain suggest that halo-fusaric acid is expected to be useful in the treatment of chronic alcoholism, Parkinson's disease, mental disorders, such as schizophrenia and manic-depressive psychosis.

Having generally described the invention, a more complete understanding can be attained by reference to certain specific examples which are provided herein for purposes of illustration only and are not intended to be construed as limiting unless otherwise so specified.

EXAMPLE 1

10 g. of dehydrofusaric acid was dissolved in 200 cc of chloroform. Bromine was added dropwise to the solution, while stirring, until the color of the solution was changed to yellowish-red. The solution was further stirred for 10 minutes. The reaction mixture was dried under reduced pressure, and the residue was dissolved in 500 cc of hot water. A small amount of insoluble material was filtered and the filtrate was maintained overnight to yield 9.6 g. of pale yellow crystals. The crystals were recrystallized from hot water to yield 10·11-dibromo-fusaric acid.

The physico-chemical properties of the compound were as follows:
Colorless needle-like crystals
Melting point : 105° – 106°C.
Beilstein reaction: positive
Elementary Analysis: ($C_{10}H_{11}O_2NBr_2$)

| | C | H | N | Br |
|---|---|---|---|---|
| Calculated value | 35.64% | 3.29% | 4.16% | 47.42% |
| Analyzed value | 35.60% | 3.33% | 4.30% | 46.92% |

Ultraviolet absorption spectrum γ max in methanol 269 mμ
$E_{1cm}^{1\%}$ 159

| | C | H | N | Br |
|---|---|---|---|---|
| Infrared absorption spectrum | | | FIG. 1 | |
| Solubility: | | | Soluble in alcohol, acetone, chloroform, benzene, ethylacetate, and hot water. Insoluble in cold water, ether, petroleum ether. | |

EXAMPLE 2

40 g. of crude dehydrofusaric acid (containing 24 g. of dehydrofusaric acid) was dissolved in 400 cc of chloroform, and the addition reaction was conducted in accprdance with the process of Example 1, to yield 28.5 g. of 10·11-dibromo-fusaric acid, of needle-like crystals having a melting point of 104°C. – 105°C. and γmax in methanol 269 m and $E_{1cm}^{1\%}$ 161 and positive of Beilstein reaction.

EXAMPLE 3

10 g. of crude dehydrofusaric acid (containing 6 g. of dehydrofusaric acid) was dissolved in 500 cc of chloroform, and 15.6 ml. of chloroform solution containing chlorine gas (containing 2 g. of $Cl_2$) was added dropwise to the solution at −10°C. while stirring. The reaction mixture was dried under reduced pressure, and the residue (oil) was dissolved in a mixture of 100 cc of methanol and 100 cc of water and the pH of the solution was adjusted to 3.5 by adding sodium hydroxide.

The solution was concentrated under reduced pressure to about 50 cc and was cooled with ice to yield a yellow precipitate. The precipitate was filtered and washed with water and dried under reduced pressure to yield 5.56 g. of yellow powder. The powder was purified through a column packing 500 g. of silica gel by column chromatography. The developer was a mixture of isopropyl ether and methanol and the development was conducted by increasing the concentration of methanol in orderly steps of 1 – 10 percent.

The fraction (fraction no. 271 – 340) which was developed and eluted by 5 percent methanol developer, was collected and dried under reduced pressure. The solid residue was recrystallized from a mixture of benzene-ether to yield 1.4 g. of 10·11-dichloro-fusaric acid.

The physico-chemical properties of the compound were as follows:

| Melting point | 119°C. – 120°C. | | | |
|---|---|---|---|---|
| Beilstein reaction | positive | | | |
| Elementary Analysis | ($C_{10}H_{11}O_2NCl_2$) | | | |
| | C | H | N | Cl |
| Calculated value | 48.41% | 4.47% | 5.65% | 28.58% |
| Analyzed value | 49.28% | 4.57% | 5.93% | 27.93% |

Ultraviolet absorption spectrum γ max in methanol 269 mμ
$E_{1cm}^{1\%}$ 228
Infrared absorption spectrum γc=O (carboxyl group 1710$^{cm-1}$)

Solubility:Soluble in alcohol, acetone, choloroform, benzene, ethylacetate, and hot water. Insoluble in cold water, ether, petroleum ether.

EXAMPLE 4

3 g. of 10·11-dibromo-fusaric acid prepared in Example 2 was dissolved in 30 cc of 2N-HCl.20 cc of 10 percent calcium chloride aqueous solution was added thereto and was stirred for 10 minutes. The pH of the solution was adjusted to 6 with 3N-NaOH and the solution was stirred at room temperature for 30 minutes. The precipitate was filtered and washed with water and was dried in vacuo to yield 3 g. of white powder of calcium 10·11-dibromo-fusarate (monohydrate).

The physico-chemical properties of the compound were as follows:

Beilstein reaction: positive
Ultraviolet absorption spectrum: $\gamma$max in methanol 270 m$\mu$ $E_{1cm}^{1\%}$ 148
Water content: 2.8 percent (Karl Fischer's method: calculated value 2.52 percent)
Solubility: Soluble in methanol and dilute hydrochloric acid. Sparingly soluble in acetone, water, chloroform, ethyl acetate and benzene.

EXAMPLE 5

The process of Example 4 was repeated using 3 g. of 10·11-dibromo-fusaric acid prepared in Example 2, except replacing the 10 percent calcium chloride aqueous solution with 10 cc of 10 percent aluminum chloride aqueous solution, to yield 2.5 g. of white powder of aluminum 10·11-dibromo-fusarate.

The physico-chemical properties of the compound were as follows:

Ultraviolet absorption spectrum: $\gamma$max in methanol 270 m$\mu$ $E_{1cm}^{1\%}$ 176.
Beilstein reaction: positive
Solubility: Soluble in methanol and dilute hydrochloric acid. Insoluble in acetone, water, chloroform, ethylacetate and benzene.

EXAMPLE 6

3 g. of 10·11-dichloro-fusaric acid having a melting point of 116°C. – 118°C. prepared in Example 3 was dissolved in 30 cc of 2N-HCl. 10 cc of 10 percent calcium chloride was added to the solution and was stirred for 10 minutes.

The pH of the mixture was adjusted to 6.5 with 3N-NaOH and was stirred at room temperature for 60 minutes.

The white precipitate was filtered and washed with water and was dried in vacuo to yield 2.8 g. of white powder of calcium 10·11-dichloro-fusarate (monohydrate). The physico-chemical properties of the compound were as follows:

Beilstein reaction: positive
Ultraviolet absorption spectrum: $\gamma$max in methanol 270 m$\mu$ $E_{1cm}^{1\%}$ 202.
Solubility: Soluble in methanol and dilute hydrochloric acid. Sparingly soluble in acetone, water, chloroform, ethylacetate and benzene.

EXAMPLE 7

10 g. of dehydrofusaric acid was dissolved in 1 l. of chloroform. Hydrogen bromide gas, generated by reacting 60 g. of phenol with 20 cc of bromine, was injected into the solution cooled with ice for 30 minutes for the addition reaction. The reaction mixture was admixed with 700 cc of water and was adjusted to pH 3.5 and the solution was stirred and extracted with chloroform. The chloroform layer was washed with water and dehydrated with sodium sulfate, and was dried under reduced pressure. The dried residue was dissolved in a small amount of n-butanol and a large amount of isopropyl ether was added and crystallized to yield 2.0 g. of white crystals.

The crystal was recrystallized from hot water, to yield pure 10-monobromo-fusaric acid. The physico-chemical properties of the compound were as follows:

Colorless needle-like crystal
Melting point: 112°C. – 113°C.
Beilstein reaction: positive
Elementary Analysis: ($C_{10}H_{12}O_2NBr$)

|  | C | H | N | Br |
|---|---|---|---|---|
| Calculated value | 46.53% | 4.69% | 5.43% | 30.96% |
| Analyzed value | 46.51% | 4.95% | 5.43% | 28.52% |

Ultraviolet absorption spectrum: $\gamma$max in methanol 269 m$\mu$. $E_{1cm}^{1\%}$ 214.
Infrared absorption spectrum: FIG. 2
Solubility: Soluble in alcohol, acetone, chloroform, benzene, ethyl-acetate, and hot water. Insoluble in cold water, ether, n-hexane, petroleum ether.

EXAMPLE 8

10 g. of crude dehydrofusaric acid (containing 6 g. of dehydrofusaric acid) was dissolved in 50 cc of 95 percent phosphoric acid. 16.6 g. of potassium iodide was added to the solution and the mixture was reacted at 80°C. for 5 hours.

The reaction mixture was cooled and admixed with 150 cc of water and was adjusted to a pH 3.5 and was extracted twice with 200 cc of chloroform. The chloroform extract was washed with 100 cc of 10 percent sodium sulfite aqueous solution, and further washed with sodium chloride saturated water and was dehydrated with magnesium sulfate and chloroform and was distilled under reduced pressure.

The residue was crystallized from hot water to yield 3.67 g. of plate-shaped crystals. The crystal was recrystallized from hot water three times to yield pure 10-monoiodo-fusaric acid.

The physico-chemical properties of the compound were as follows:

| Plate-shaped crystals | | | |
|---|---|---|---|
| Melting point | 114°C. – 115°C. | | |
| Elementary Analysis | ($C_{10}H_{12}O_2NI$) | | |
|  | C | H | N |
| Calculated value | 39.40% | 4.00% | 4.60% |
| Analyzed value | 39.58% | 3.96% | 4.65% |

Figure 3:
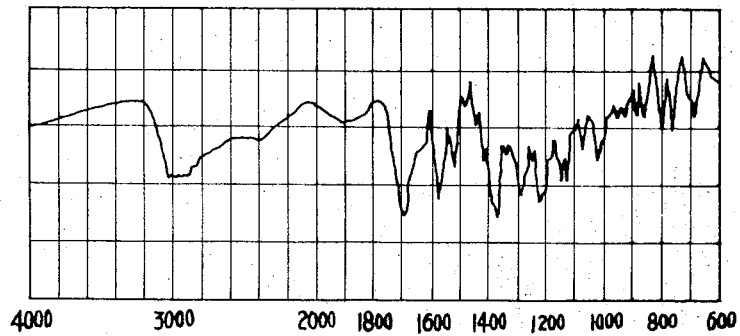

Ultraviolet absorption spectrum: $\gamma$max in methanol 269 m$\mu$. $E_{1cm}^{1\%}$ 196.
Infrared absorption spectrum: FIG. 3
Solubility: Soluble in alcohol, acetone, chloroform, benzene, ethylacetate, and hot water. Insoluble in cold water, ether, petroleum ether.

| Nuclear magnetic resonance spectrum (CDCl$_3$) | | |
|---|---|---|
| $\delta$ 1.9 – 2.0, | 3H doublet | ($CH_3$—CHX—) |
| $\delta$ 1.9 – 2.3, | 2H quartet | (—CHX—$CH_2$—$CH_2$—) |
| $\delta$ 2.7 – 3.1, | 2H triplet | (—$CH_2$—$CH_2$—pyridine) |
| $\delta$ 3.7 – 4.3 | 1H sixtet | ($CH_3$—CHX—$CH_2$—) |
| $\delta$ 7.5 – 8.6 | 3H | (Aromatic H) |
| $\delta$ 10.3 | 1H singlet | (Carboxylic H) |

EXAMPLE 9

1.14 g. of 10-monobromo-fusaric acid prepared in Example 7 was dissolved in 15 cc of 2N-HCl. 10 cc of 10 percent calcium chloride was admixed with the solution and stirred for 10 minutes, and was adjusted to pH 6.6 with 3N-NaOH. It was then stirred at room temperature for 60 minutes. The white precipitate was filtered and washed with water and dried in vacuo to yield 1.05 g. of white powder of calcium 10-monobromo-fusarate monohydrate.

The physical and chemical properties of the compound were as follows:

Beilstein reaction: positive

Ultraviolet absorption spectrum: $\gamma$max in methanol 270 m$\mu$. $E_{1cm}^{1\%}$ 193.

Water content: 3.3 percent (Karl Fischer's method. Calculated value 3.15 percent as $C_{20}H_{22}O_4N_2Br_2Ca \cdot H_2O$)

Calcium content: 7.1 percent (calculated value 7.0 percent)

Solubility: Soluble in methanol and diluted hydrochloric acid. Sparingly soluble in water, acetone, chloroform and benzene.

EXAMPLE 10

1.37 g. of 10-monoiodo-fusaric acid prepared in accordance with Example 8 was dissolved in 15 cc of 2N-HCl and 10 percent calcium chloride was admixed with the solution and stirred for 10 minutes, and was adjusted to pH 7.2 with 3N-NaOH. It was then stirred at room temperature for 80 minutes.

The white precipitate was filtered and washed with water and dried in vacuo to yield 1.2 g. of white powder of calcium 10-monoiodo-fusarate monohydrate.

The physico-chemical properties of the compound were as follows:

Water content: 2.9 percent (Karl Fischer's method. Calculated value 2.62 percent as $C_{20}H_{22}O_4N_2I_2Ca \cdot H_2O$)

Calcium content: 6.0 percent (calculated value 5.84 percent)

Ultraviolet absorption spectrum $\gamma$max in methanol 270 m$\mu$. $E_{1cm}^{1\%}$ 160.

Solubility: Soluble in methanol and dilute hydrochloric acid. Sparingly soluble in water, acetone, chloroform, ethylacetate and benzene.

(Reference 1)

Preparation of acetoxymethyl ester of fusaric acid 7.2 g. of fusaric acid was dissolved in 40 ml. of dimethylformamide and was admixed with 8.7 g. of chloromethylacetate and 7.8 ml. of triethylamine. The mixture was stirred at room temperature for 4 hours. The triethylamine salt precipitate was filtered and the filtrate was admixed with 120 ml. of ethylacetate and 40 ml. of water and was adjusted to pH 9.0 with 20 percent sodium hydrochloride.

The acid and dimethylformamide were removed through the separated water layer and the product was washed with water, and was dried with anhydrous magnesium sulfate and concentrated to yield 5.5 g. of oily product. 3.5 g. of the oily product was dissolved in 20 ml. of 3N-HCl and was concentrated and dried under reduced pressure.

The physico-chemical properties of the compound were as follows:

Melting point: 138° – 141°C.
Infrared absorption spectrum:

$IRv_{max}^{KBr}$ (cm$^{-1}$): 2900, 2500, 2000, 1740, 1600, 1550, 1400, 1200, 1120

Elementary Analysis: ($C_{13}H_{18}O_4NCl$)

|  | C | H | N | Cl |
|---|---|---|---|---|
| Calculated value | 54.23% | 6.30% | 4.84% | 12.32% |
| Analyzed value | 54.19% | 6.31% | 4.85% | 12.30% |

(Reference 2)

Preparation of pivaloyloxymethyl ester of fusaric acid 3.59 g. of fusaric acid was dissolved in 20 ml. of dimethylformamide and was admixed with 6.0 g. of chloromethylpivalate and 3.9 ml. of triethylamine and the mixture was stirred at room temperature for 4 hours. The triethylamine salt precipitate was filtered and washed with 60 ml. of ethylacetate and twice with 20 ml. of water to remove unreacted acid and dimethylformamide. The ethyl acetate layer was dehydrated and concentrated to yield 6.4 g. of oily product.

2.3 g. of the oily product was dissolved in 15 ml. of ether and was admixed with 6.7 ml. of 4.3 w/v percent of isopropylalcohol-hydrochloric acid mixture, and was stirred at room temperature for 30 minutes. Then, the ether solution was concentrated and dried, and was washed with petroleum ether and was recrystallized from isopropyl alcohol, and petroleum ether.

The physico-chemical properties of the compound were as follows:

Melting point: 95 – 89°C.
$IRv_{max}^{KBr}$ (cm$^{-1}$): 2950, 2500, 2060, 1950, 1750, 1600, 1550, 1480, 1370, 1250, 1120

Elementary Analysis: ($C_{16}H_{24}O_4NCl$)

|  | C | H | N | Cl |
|---|---|---|---|---|
| Calculated value | 58.23% | 7.33% | 4.12% | 10.74% |
| Analyzed value | 58.20% | 7.34% | 4.13% | 10.71% |

EXAMPLE 11

Preparation of pivaloyloxymethyl ester of dibromo-fusaric acid 1.5 g. of 5-(3,4-dibromobutyl)-2-picolinic acid (dibromo-fusaric acid) was dissolved in 5 ml. of dimethylformamide, and was admixed with 1.5 g. of pivaloyloxychloromethyl ester and 1 ml. of triethylamine and was stirred at room temperature for 4 hours to concentrate it, in accordance with said Reference 1, to yield 2.1 g. of oily product.

1.6 g. of the oily product was admixed with 3.3 ml. of 4.3 w/v percent of isopropyl alcohol-hydrochloric acid mixture and was stirred for 30 minutes. The solution was concentrated and dried, and was crystallized and dried, and was recrystallized from ether and recrystallized from isopropyl alcohol-ether mixture to yield the hydrochloride of pivaloyloxymethyl ester of dibromo-fusaric acid.

The physico-chemical properties of the compound were as follows:

| | Melting point: | 92 – 98°C. | | | |
| --- | --- | --- | --- | --- | --- |
| | Elementary Analysis: | ($C_{16}H_{22}O_4NClBr_2$) | | | |
| | C | H | N | Cl | Br |
| Calculated value | 39.40% | 4.54% | 2.87% | 7.27% | 32.77% |
| Analyzed value | 39.31% | 4.58% | 2.89% | 7.20% | 32.89% |

(Reference 3)

Preparation of benzoxymethyl ester of fusaric acid 3.6 g. of fusaric acid was dissolved in 20 ml. of dimethylformamide, and was admixed with 4.1 g. of chloromethylbenzoate and 3.9 ml. of triethylamine and was stirred at room temperature for 4 hours. The reaction product was extracted and concentrated in accordance with Example 11 to yield 5.4 g. of an oily product. 2.5 g. of the oily product was dissolved in 15 ml. of ether and was admixed with 6.7 ml. of 4.3 m/v percent of isopropyl alcohol-hydrochloric acid mixture, and was stirred at room temperature for 30 minutes. The precipitated crystal was filtered to yield the hydrochloride benzoxymethyl ester of fusaric acid.

The physico-chemical properties of the compound were as follows:

| | Melting point: | 92 – 94°C. | | |
| --- | --- | --- | --- | --- |
| | Elementary Analysis: | ($C_{18}H_{20}O_4NCl$) | | |
| | C | H | N | Cl |
| Calculated value | 61.80% | 5.76% | 4.00% | 10.10% |
| Analyzed value | 61.70% | 5.80% | 4.03% | 10.31% |

EXAMPLE 12

Preparation of pivaloyloxymethyl ester of 10·11-dibromo-fusaric acid and hydrochloride thereof 1.5 g. of 10·11-dibromo-fusaric acid was dissolved in 5 ml. of dimethylformamide, and admixed with 1.5 g. of chloromethylpivalate and 1 ml. of triethylamine. The mixture was stirred at room temperature for 4 hours. The triethylamine hydrochloride precipitate was filtered, and then the filtrate was admixed with 60 ml. of ethylacetate and 40 ml. of water and was adjusted to a pH of 9 with 20 percent sodium hydroxide. The unreacted 10·11-dibromo-fusaric acid and dimethylformamide were removed through the separated water layer. The ethylacetate layer was separated and the dehydrated layer was separated and dehydrated with anhydrous magnesium sulfate. The solvent was distilled off to yield 2.1 g. of an oily product.

The infrared absorption spectrum of the compound was:

RI$\gamma_{max}^{KBr}$ (cm$^{-1}$): 2950, 2865, 1750, 1675, 1600, 1480, 1310, 1255, 1220, 1150, 1100, 1030, 980, 710.

The pivaloyloxymethyl ester of 10·11-dibromo-fusaric acid hydrochloride obtained from said ester had a melting point of 92° – 98°C.
Elementary Analysis: ($C_{16}H_{22}O_4NClBr_2$)

| | C | H | N | Cl | Br |
| --- | --- | --- | --- | --- | --- |
| Calculated value | 39.31% | 4.58% | 2.89% | 7.20% | 32.89% |
| Analyzed value | 39.40% | 4.54% | 2.89% | 7.27% | 32.77% |

Having now fully described the invention, it will be apparent to one of ordinary skill in the art that many changes and modifications can be made thereto without departing from the spirit or scope of the invention as set forth herein.

What is claimed and intended to be secured by Letters Patent is:

1. A substituted fusaric acid derivative of the formula:

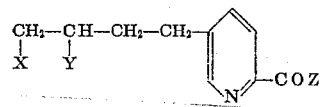

wherein X represents hydrogen or halogen; Y represents halogen; Z represents -OM and M represents a salt or ester residue selected from the group consisting of dibenzylethylene-diamine, procaine salt, acetoxymethyl, ethoxymethyl, phenacyloxymethyl, benzoyloxymethyl, and pivaloyloxymethyl groups.

2. The substituted fusaric acid derivative of claim 1, wherein X and Y are halogen.

3. The substituted fusaric acid derivative of claim 2 wherein X and Y are Br.

4. A substituted fusaric acid derivative of the formula:

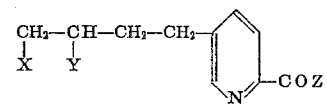

wherein X represents hydrogen or halogen, Y represents halogen, Z represents -OM and M represents hydrogen or a salt or ester residue selected from the group consisting of sodium, potassium, calcium, magnesium, aluminum and residues of methyl, ethyl and acyloxymethyl groups.

5. The substituted fusaric acid of claim 4, wherein X and Y are halogen and M is hydrogen, calcium or aluminum.

6. The substituted fusaric acid of claim 4, wherein X is hydrogen, Y is halogen and M is hydrogen, calcium or aluminum.

7. The substituted fusaric acid of claim 5, wherein X and Y are chloro and M is hydrogen.

8. The substituted fusaric acid of claim 5, wherein X and Y are bromo and M is hydrogen.

9. The substituted fusaric acid of claim 6 wherein Y is bromo and M is hydrogen.

10. A substituted fusaric acid derivative of the formula:

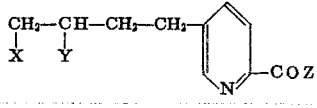

wherein X represents hydrogen or halogen; Y represents halogen; Z represents an amino group.

11. The substituted fusaric acid derivative of claim 10 wherein Z represents monoethylamino or dimethylamino group.

12. The substituted fusaric acid of claim 6, wherein Y is iodo and M is hydrogen.

13. The substituted fusaric acid of claim 6, wherein Y is bromo and M is calcium.

* * * * *